US006472618B1

(12) United States Patent
Izumo et al.

(10) Patent No.: US 6,472,618 B1
(45) Date of Patent: Oct. 29, 2002

(54) ELECTRONIC WEIGHING SCALE USING GENERAL PURPOSE BLOCK MEMBER

(75) Inventors: Naoto Izumo, Saitama (JP); Kyouhei Ohyama, Saitama (JP); Eiichi Yoshida, Saitama (JP)

(73) Assignee: A&D Co., Ltd., Tokyo (JP)

( * ) Notice: Subject to any disclaimer, the term of this patent is extended or adjusted under 35 U.S.C. 154(b) by 0 days.

(21) Appl. No.: 09/535,404

(22) Filed: Mar. 27, 2000

(30) Foreign Application Priority Data

Mar. 30, 1999 (JP) .......................................... 11-087937
Aug. 11, 1999 (JP) .......................................... 11-227201
Sep. 17, 1999 (JP) .......................................... 11-263110

(51) Int. Cl.[7] ................................................ G01G 7/00
(52) U.S. Cl. .............................. 177/210 EM; 177/229; 177/212; 73/1.15; 73/862.639
(58) Field of Search .................... 177/210 EM, 212, 177/229; 73/862.634, 862.639, 1.13, 1.15

(56) References Cited

U.S. PATENT DOCUMENTS

| 4,020,686 A | * | 5/1977 | Brendel ................. 73/862.639 |
| 4,128,001 A | * | 12/1978 | Marks ......................... 73/1.13 |
| 4,448,085 A | * | 5/1984 | Lee ........................ 73/862.639 |
| 4,453,609 A | * | 6/1984 | Griffen et al. ............... 177/211 |
| 4,657,097 A | * | 4/1987 | Griffen ........................ 177/229 |
| 4,798,251 A | * | 1/1989 | Maaz et al. .................. 177/229 |
| 4,799,561 A | * | 1/1989 | Komoto ....................... 177/229 |
| 4,813,505 A | * | 3/1989 | Södler et al. ................ 177/212 |
| 4,892,163 A | * | 1/1990 | Aumard ....................... 73/1.13 |
| 5,293,007 A | * | 3/1994 | Darst et al. .................. 177/229 |
| 5,315,073 A | | 5/1994 | Ast et al. ..................... 177/229 |
| 5,340,951 A | | 8/1994 | Hungerbuehler et al. ... 177/229 |
| 5,459,289 A | * | 10/1995 | Burkhard ..................... 177/244 |
| 5,525,762 A | | 6/1996 | Maaz et al. .................. 177/229 |
| 5,591,944 A | * | 1/1997 | Meyer ......................... 177/229 |
| 5,604,336 A | * | 2/1997 | Johnson ....................... 177/229 |
| 5,739,425 A | * | 4/1998 | Binnig et al. .......... 73/862.634 |
| 6,232,567 B1 | * | 5/2001 | Bonino et al. ....... 177/210 EM |

FOREIGN PATENT DOCUMENTS

DE   19540782 C1   12/1996
DE   19754172 C1   4/1999

* cited by examiner

*Primary Examiner*—Randy W. Gibson
(74) *Attorney, Agent, or Firm*—Jordan and Hamburg

(57) ABSTRACT

A weighing scale includes an integral block member having a load receiving portion for receiving a load of a scaled object; a fixing portion for fixing the integral block; and a Roberval portion having recessed portions between the load receiving portion and the fixing portion. The scale also includes a load transmitting beam; a member for transmitting displacement of the load transmitting beam and the load receiving portion to the load transmitting beam and for becoming a force point of the load transmitting beam; a fulcrum member of the load transmitting beam; and a fulcrum member attachment portion being formed on the integral block so that the fulcrum of the of the load transmitting beam is positioned in a space thereby constituting the weighing scale. The member for transmitting displacement of the load transmitting beam and fulcrum member of the load transmitting beam are formed separately from the integral block member. An integral block member may include a working guide recess. An integral block member may include a reinforcing member.

14 Claims, 10 Drawing Sheets

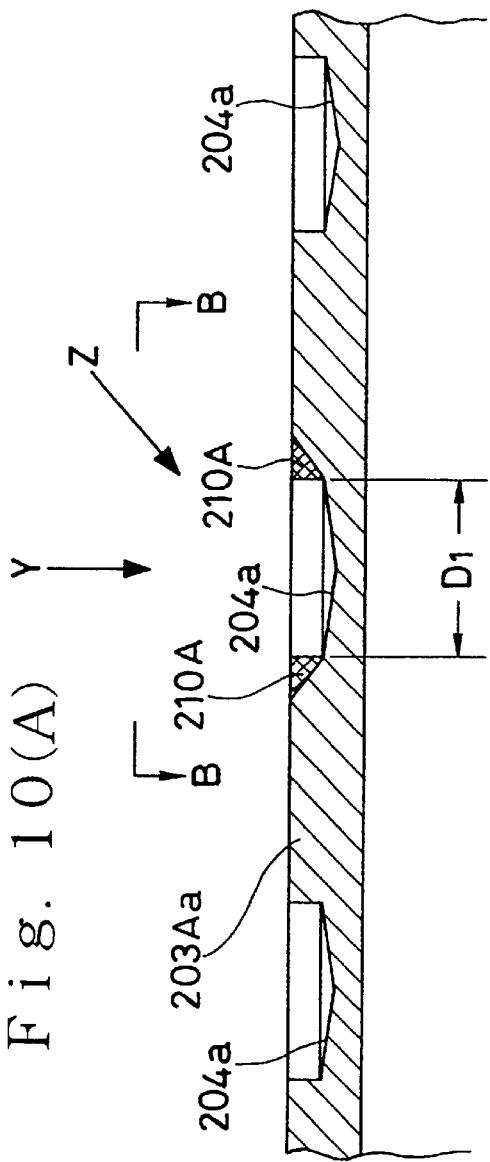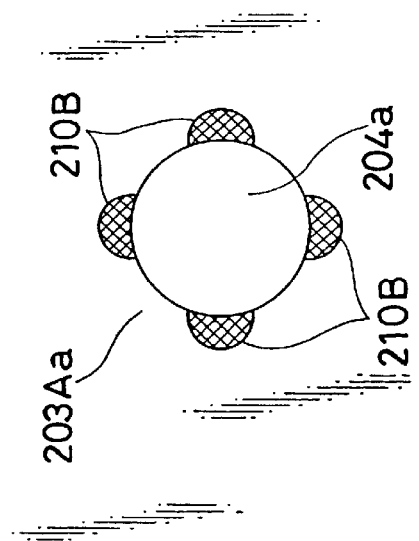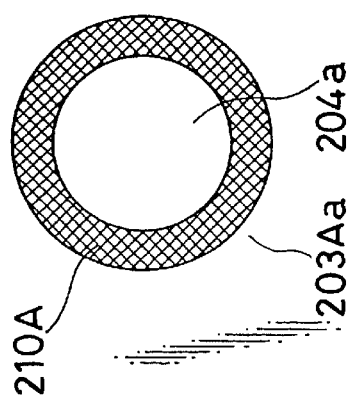

ELECTRONIC WEIGHING SCALE USING GENERAL PURPOSE BLOCK MEMBER

BACKGROUND OF THE INVENTION

1. Field of the Invention

The present invention relates to an electronic weighing scale using a general purpose block member which can be utilized as a Roberval mechanism or as an elastic body of an electronic weighing scale of a load cell type, and more particularly to an electronic weighing scale of an electromagnetic equilibrium type using the general purpose block member as an integral type Roberval mechanism.

2. Prior Art

The electronic weighing scale of the electromagnetic equilibrium type which is referred to as an electronic balance comprises a load receiving portion for receiving the load of an object such as a weighing scale pan, an electromagnetic portion for generating electromagnetic force which equilibrates with the load, a load transmitting mechanism for transmitting the load received by the load receiving portion to the electromagnetic portion, and a Roberval mechanism for guiding the load transmitting mechanism.

These mechanisms are constituted by assembling several tens of parts, for example, various members such as a load transmitting beam, a member for constituting the Roberval mechanism, a connecting member such as a leaf spring for connecting these members, a screw for fixing these members and the like.

As a matter of course, with the above-mentioned structure, an assembly man-hour is great and it is necessary to finely adjust each portion of the mechanism with complexity after the assembly as a result of the combination of a large number of parts. If the mechanisms are formed of one material and are changed into one block, the assembly man-hour can be reduced greatly.

In consideration of this respect, there has been proposed an electronic balance using a block member of a complete integral type which constitutes each portion except the electromagnetic portion as one metal block. The block of the complete integral type is obtained by forming originally individual members from one metal block. Therefore the internal shape of the whole block is complicated and a high working precision is required.

An example of the block has been disclosed in U.S. Pat. Nos. 4,799,561 and 5,525,762, German Patent Nos. DE19754172C1 and DE19540782C1 and the like. Since these have a structure in which an electromagnetic portion for generating equilibrium force is housed in a block, mechanisms can be constituted to have small sizes but their shapes are very complicated.

U.S. Pat. No. 5,315,073 (EPC Patent No. EP055876B1) has disclosed a structure in which an electromagnetic portion is arranged in the concave portion of a block having one of ends opened. In this respect, the structure is slightly simpler than the block structure. However, the fulcrum of a lever for transmitting a load is elastically supported. Therefore, a high working precision is required.

As described above, although the main parts of an internal mechanism constituting the electronic balance is formed into one block to obtain great advantages, the following problems arise and the solution of the problems has been desired.

First of all, as the premise of the formation into one block, an almost rectangular metal block such as an aluminum based alloy is subjected to a fine working. Thus, a load receiving portion, a load transmitting portion using a lever, a thin deforming portion for permitting the operation of the load transmitting portion, a Roberval portion for guiding the load transmitting mechanism, a thin fulcrum portion and the like are formed for the metal block. The one-block working is carried out by performing the complicated and fine cutting for the metal block using means capable of performing a fine working such as cutting working, a discharge machining device using wire cutting as described in U.S. Pat. No. 5,340,951. For this reason, a high working precision is required over the whole metal block and a special working method is necessary. Therefore, the productivity of the block is not always high.

In the electronic balance in the working stage or thus manufactured, even if troubles are made on a part of the block, the problematic parts cannot be exchanged because of the integral properties. Therefore, there is a problem in that the whole block cannot be used. Any structure of the block is basically formed by working the almost rectangular metal block. For this reason, portions to be operated as respective members are arranged in the rectangle as a matter of course. Also in this respect, the arrangement of the portions to be the respective members has a restriction. For example, there is a problem in that a high leverage cannot be taken including the problem of the strength of the block in a member for transmitting a load, for example. Moreover, with such a structure as to form each member in a block member by a fine space obtained by a wire cutting discharge machining, the width of the cut space is very small, for example, approximately 0.3 mm. Therefore, refuse gets into the space portion, thereby causing an operation failure.

Also in a normal block member, it is always necessary to perform an adjusting work for the whole weighing scale mechanism when constituting the weighing scale mechanism by the assembly of the block member to the device and the fixation of the member such as the weighing scale or the like to the block member. This respect will be described by using a block model having a simplified structure with reference to FIG. 17.

An integral type Roberval mechanism 420 formed integrally with a metal block such as an aluminum member has elliptical space portions 422A and 422B formed on both ends through a central communicating space portion 421. Consequently, thin portions 422A$a$, 422A$b$, 422B$a$ and 422B$b$ are formed on the upper and lower portions of the space portions 422A and 422B, respectively.

In the integral type Roberval mechanism 420, fine adjustment is carried out by scraping any of the thin portions of the integral type Roberval mechanism 420 by means of a file or the like to make the same portion thinner corresponding to a shift error. More specifically, the fine adjustment is carried out by diagonally cutting any of front portions 422A$a_1$, 422A$a_2$, 422B$a_1$ and 422B$a_2$ of the upper thin portion 422A$a$. In addition, it is necessary to adjust the thickness of the whole thin portions 22A and 22B when adjusting the error of the front and rear relationship of the shift error. Forth is reason, the adjusting work cannot be easily carried out even in the integral type Roberval mechanism 420 having a simple model as shown. Furthermore, it is very hard to carry out the adjusting work for a complicated block member of the integral type.

SUMMARY OF THE INVENTION

In consideration of such a request, it is an object of the present invention to provide an electronic weighing scale which removes the problems of a complete integral type block member and has a small-sized mechanism portion capable of saving parts, an electronic weighing scale using a general purpose block member of an integral type which is constituted to be operated as a Roberval mechanism or an elastic body of a load cell corresponding to an electronic weighing scale of an electromagnetic equilibrium type or an electronic weighing scale of a load cell type, and an electronic weighing scale constituted to simplify a block structure more than a complete integral type block member, to easily execute the adjustment of the block member and to carry out application of a load to the block member more properly.

A first structure of the present invention is directed to an electronic weighing scale using an integral type block member constituted to operate as a Roberval mechanism or an elastic body of a load cell, the integrally formed block member including a load receiving portion for receiving a load of a scaled object, a fixing portion for fixing the whole block, and a Roberval portion formed as a space portion having a thinned portion between the load receiving portion and the fixing portion for operating as a Roberval, wherein a member for transmitting a displacement of a load transmitting beam and the load receiving portion to the load transmitting beam and for becoming a force point of the load transmitting beam and a member to be a fulcrum of the load transmitting beam are formed separately from the block member, and a member attachment portion constituting a fulcrum and a force point is formed on the block member such that the fulcrum or force point of the load transmitting beam is positioned in a space or closely to the space, preferably, the member to be the fulcrum is positioned on right and left sides of the Roberval portion, thereby constituting the electronic weighing scale of an electromagnetic equilibrium type.

A second structure of the present invention is directed to an electronic weighing scale using an integral type block member constituted to operate as a Roberval mechanism or an elastic body of a load cell, the integrally formed general purpose block member is provided with a space portion having a thinned portion in four upper and lower portions between a load receiving portion for receiving a load of a scaled object and a whole block, a working guide portion indicating a part to be thinned by cutting or the like is formed on at least one of surfaces of the thinned portions in two upper places, and an adjusting portion for performing adjustment by thinning a predetermined part of the working guide portion from above the Roberval portion is provided.

A third structure of the present invention is directed to an electronic weighing scale using an integral type block member constituted to operate as a Roberval mechanism or an elastic body of a load cell, wherein a support member for supporting the general purpose block member includes an attachment portion fixed to a side edge of the general purpose block member and a fixed portion for horizontally supporting the general purpose block member which is attached to the attachment portion, a load transmitting member for transmitting a load to the general purpose block member has an attachment portion to be attached to a block side edge on a side opposite to the side edge on the support member attachment side, and a load receiving portion positioned in parallel with a body portion of the support member through a block, a member for directly receiving a load such as a weighing scale pan is connected to the load receiving portion of the load transmitting member, and the support member and the load transmitting member are formed almost point symmetrically with each other by using, as a symmetrical point, a point positioned in almost a central portion of the general purpose block member, and an applied load and reactive force to the load are positioned on almost the same axis.

BRIEF DESCRIPTION OF THE DRAWINGS

FIG. 10A is a sectional view taken along the line A—A in FIG. 9, FIG. 10B is a perspective view showing an example seen from B—B in FIG. 10A, and FIG. 10C is a perspective view showing another example seen from the B—B in FIG. 10A;

DETAILED DESCRIPTION OF THE PREFERRED EMBODIMENT

Figure 1:
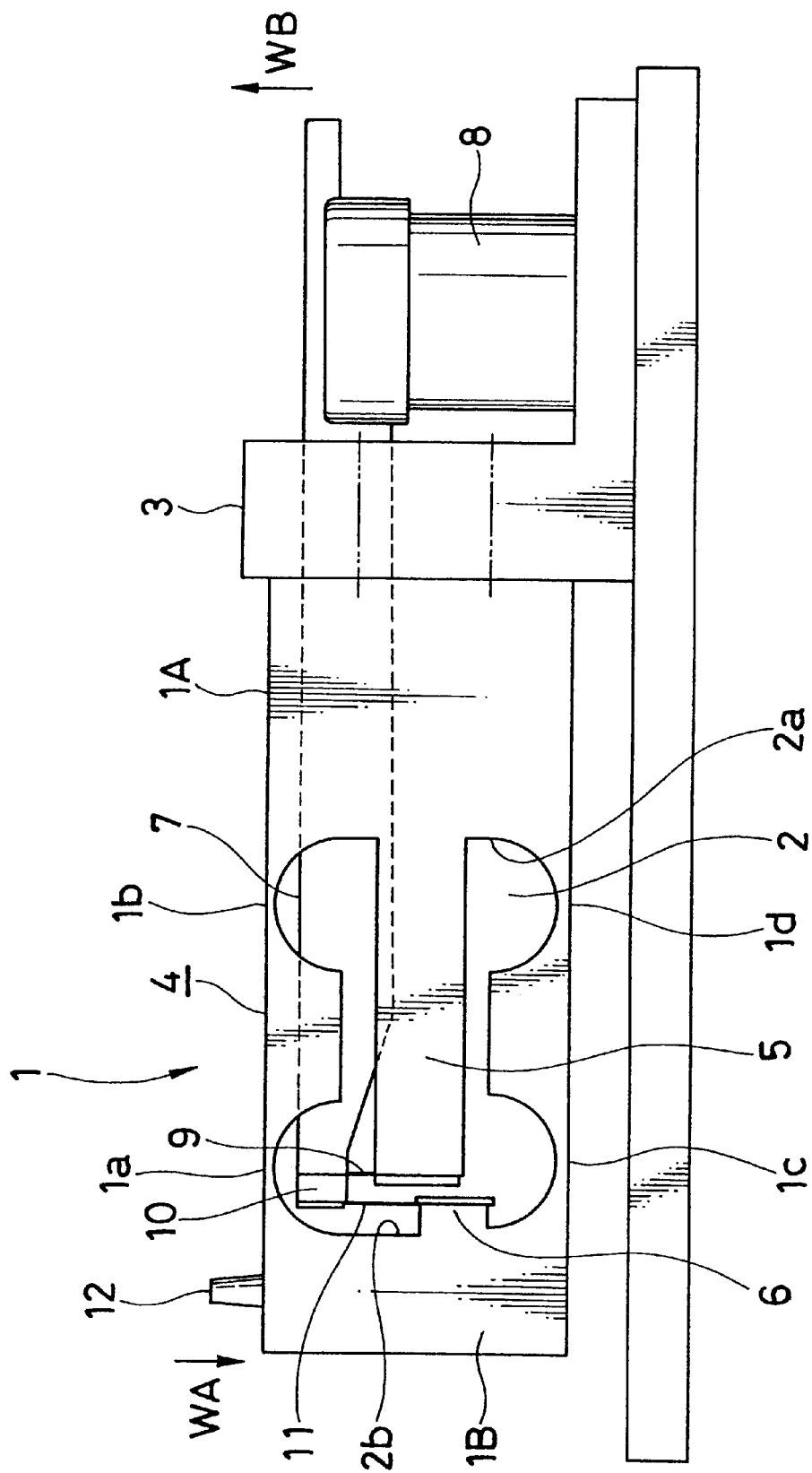
FIG. 1 is a view showing the mechanism of an electronic weighing scale of an electromagnetic equilibrium type according to a first embodiment of the present invention.
Figure 2:
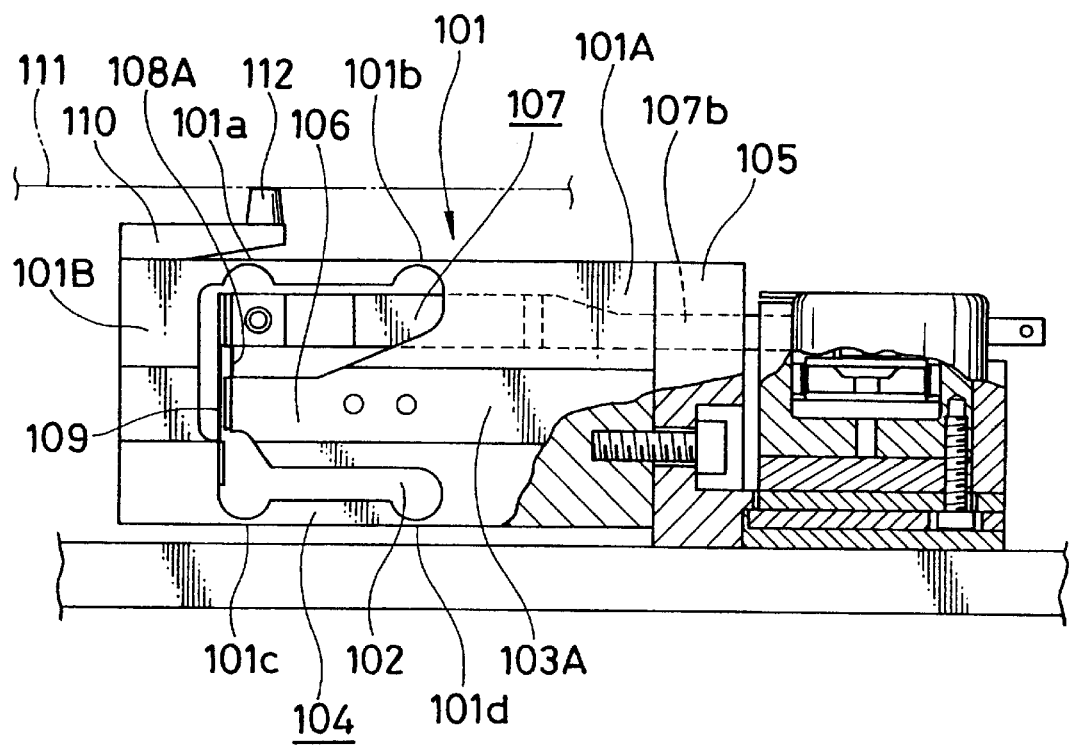
FIG. 2 is a view showing the mechanism of an electronic weighing scale of an electromagnetic equilibrium type according to a second embodiment of the present invention.
Figure 3:
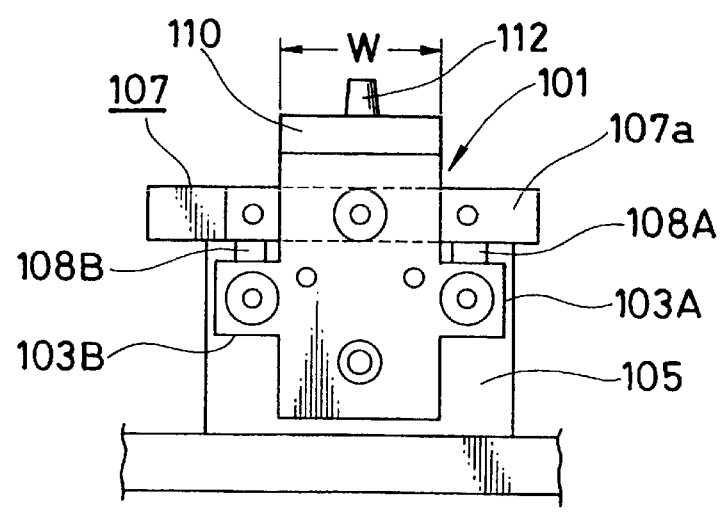
FIG. 3 is a side view showing the mechanism illustrated in FIG. 2.
Figure 4:
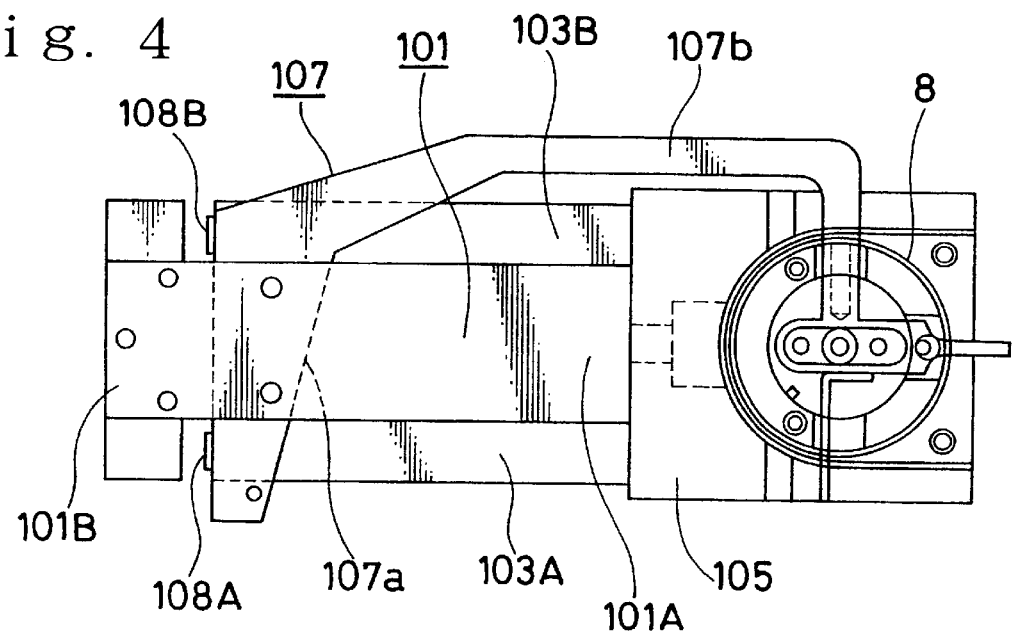
FIG. 4 is a plan view showing the mechanism illustrated in FIG. 2.

Preferred embodiments of the present invention will be specifically described below with reference to the drawings.

First of all, a first embodiment of the present invention will be described. In the present embodiment, each member is fixed to a general purpose block member (which will be hereinafter referred to as a "block member" it there is no misunderstanding) with a comparatively simple structure, and the function and mutual relationship of each member can easily be understood from the structure of the drawings. Therefore, the structure, function and mutual action of each member and the like will be mainly described according to the present embodiment.

In the drawing, an arrow 1 denotes a block member to be used as an integral type Roberval mechanism in an electronic weighing scale of an electromagnetic equilibrium type.

The block member 1 is fixed to a block support member 3 and is wholly overhung. The reference numeral 1A denotes a fixed portion of the block member 1 which is to be connected and fixed to the block support member 3, and the reference numeral 1B denotes a load receiving portion placed in a position opposite to the fixed portion 1A for receiving a load through a Roberval portion which will be described below. A space portion 2 is formed in the body. of the block member 1 in such a manner that thin portions 1a, 1b, 1c and 1d are formed in four upper and lower portions of the block member 1. In the block member 1, a Roberval portion 4 is formed in which a part including the thin portions 1a to 1d act as a Roberval mechanism around the space portion 2.

A fulcrum attachment portion 5 is formed and protruded like a peninsula from an end 2a on the fixed portion 1A side of the block member 1 toward an end 2b on the load receiving portion 1B side for the space portion 2 of the Roberval portion 4. On the other hand, a suspension band fixing portion 6 for fixing a metal sheet 11 formed separately from the block member 1 (which will be hereinafter referred to as a "suspension band") is formed on the end 2b at the load receiving portion side. The reference numeral 7 denotes a load transmitting beam which is the center of the load transmitting mechanism for transmitting a load to an electromagnetic portion 8 and which has one of ends connected to the electromagnetic portion 8.

The side of the load transmitting beam 7 positioned in the Roberval portion 4 has such a structure that the load transmitting beam 7 is operated as a lever. First of all, a fulcrum spring 9 formed of a leaf spring is attached as a member to be the fulcrum of the lever to the tip of the fulcrum attachment portion 5, and the other end of the fulcrum spring 9 is fixed to the load transmitting beam 7. Consequently, the load transmitting beam 7 is constituted such that it can be rocked around the fulcrum spring 9.

One of the ends of the suspension band 11 is attached through a beam projection 10 formed in the fulcrum spring attachment portion of the load transmitting beam 7, and the other end of the suspension band 11 is fixed to the suspension band attachment portion 6 formed on the end 2b at the load receiving portion side of the space portion 2. More specifically, the load transmitting beam 7 is constituted such that a distance between the fulcrum spring 9 and the suspension band 11 and a distance between the fulcrum spring 9 and the other hand of the beam 7 (a connecting portion with a central portion for generating electromagnetic equilibrium force) have a leverage. In other words, the fulcrum spring 9 and the suspension band 11 which are members forming a fulcrum and a force point are independently formed separately from the block member 1. Consequently, it is possible to set a distance between the fulcrum and the force point to a desired value. Consequently, restrictions on the work of the complete integral type block are eliminated so that the leverage of the load transmitting beam 7 can be highly set to a desired value. In this connection, it is necessary to employ a double lever structure to obtain a high leverage in the conventional complete integral type block. Consequently a block working becomes hard still more.

With the above-mentioned structure, when a load is applied through a pan receiving pin 12 provided on the integral type Roberval mechanism portion 1, the Roberval portion 4 mainly including the space portion 2 acts as a Roberval mechanism so that the load receiving member 1B tries to be displaced in the WA direction. The displacement is transmitted to the load transmitting beam 7 through the suspension band 11, and the load transmitting beam 7 uses the suspension band 11 and the fulcrum spring 9 as a force point and a fulcrum respectively, thereby displacing an end thereof in the WB direction corresponding to the above-mentioned leverage. This displacement is detected by a sensor (not shown) to adjust a quantity of electricity such that electromagnetic force equilibrated with the displacement is generated by the electromagnetic portion 8. Consequently, the applied load is converted into the quantity of electricity. Thus, the load is measured.

FIGS. 2 to 5 show a second embodiment of the present invention, illustrating a structure obtained by taking the mounting on an electronic weighing scale of an electromagnetic equilibrium type into consideration more practically.

In the drawing, an arrow 101 denotes a block member, the reference numeral 101A denotes a fixed portion to be supported and fixed onto a block member support member 105, the reference numeral 101B denotes a load receiving portion, and both of them correspond to the fixed portion 1A and the load receiving portion 1B in the above-mentioned embodiment. The reference numeral 102 denotes a space portion formed on the block member 101. By the formation of the space portion 102, thin portions 101a, 101b, 101c and 101d are formed in two upper and lower portions of the block member 101 in the same manner as in the above-mentioned embodiment, and a Roberval portion 104 is formed around the thin portions 101a to 101d and the space portion 102.

Beam-shaped portions 103A and 103B are formed and protruded in the longitudinal direction of the block member 101 on both sides of the block member 101. The beam-shaped portions 103A and 103B are constituted to achieve some technical objects as will be described below.

Figure 5:
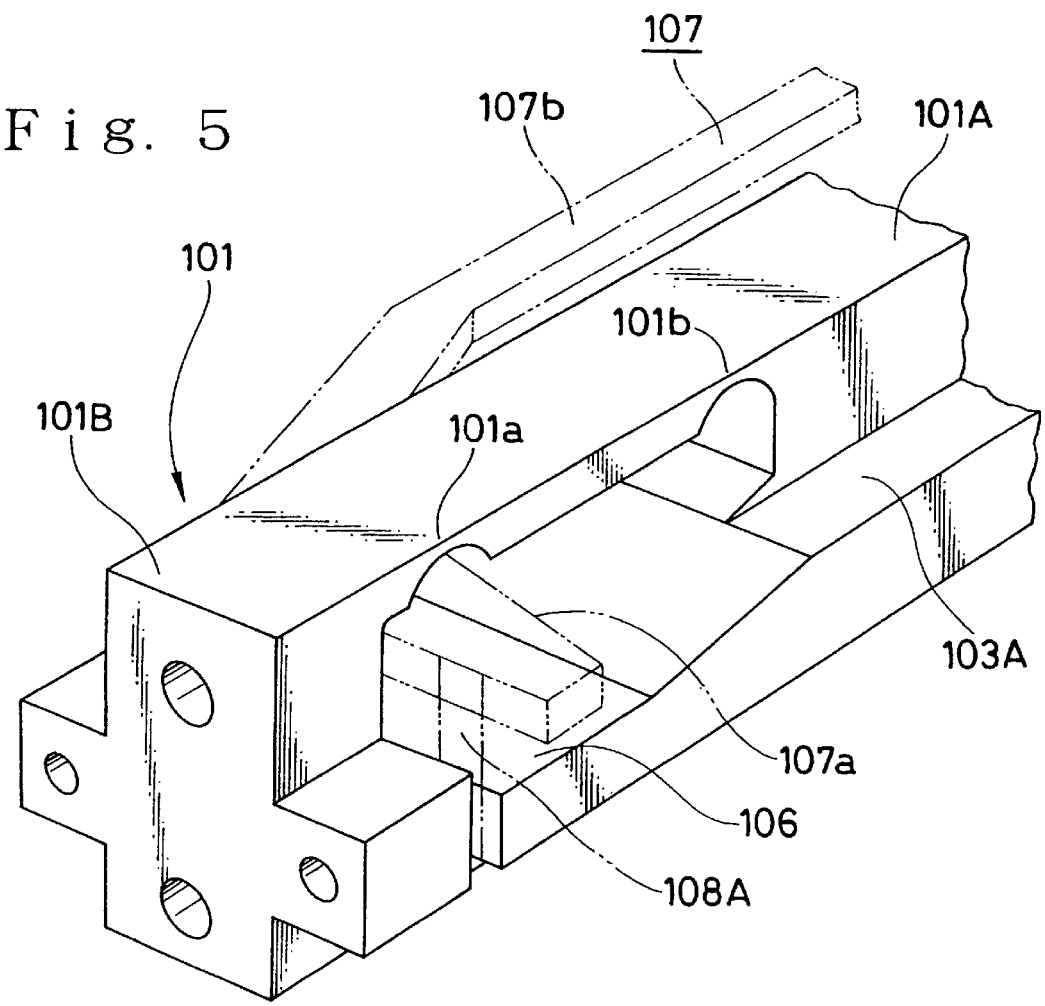
FIG. 5 is a perspective view showing the details of a general purpose block member as an integral type Roberval mechanism portion illustrated in FIG. 2 to FIG. 4.

A fulcrum attachment portion 106 is formed and protruded, into the space portion 102, as a wide member obtained by the widths of the beam-shaped portions 103A and 103B protruded onto both sides of an integral type Roberval mechanism portion 101 to the width of the Roberval portion 104 (see FIG. 5).

The reference numeral 107 denotes a load transmitting beam. While the load transmitting beam 107 is formed to have an asymmetrical planar shape as seen from FIGS. 4 and 5, and an arm portion 107b is provided on only one of the integral type Roberval mechanism portion 1, this structure is not essential to the present invention. More specifically, if the load transmitting beam 107 has such a symmetrical shape that an arm is positioned on both sides of the integral type Roberval mechanism portion 1, it is hard or impossible to provide the fulcrum portion of the load transmitting beam 107 in the space portion 102. For example, therefore, the load transmitting beam having a symmetrical planar shape can be attached as a matter of course by constituting one of the arms to be disassemblable and employing a structure in which the load transmitting beam is provided in the space portion 102 and the arm is then connected.

The reference numerals 108A and 108B denote a fulcrum spring. In the present embodiment, one of ends of each of the fulcrum springs 108A and 108B is fixed on the outside of the Roberval portion 104 and the other end is fixed to a fulcrum spring attachment portion 107a of the load transmitting beam 107 provided in the space portion 102 in the vicinity of both ends in the transverse direction of the fulcrum attachment portion 106 formed widely as described above. The fulcrum attachment portion 106 is formed widely as described above. Therefore, a portion to which a plurality of fulcrum springs are attached is sufficiently kept, and furthermore, the fulcrum attachment portion 106 can maintain a sufficient strength. Therefore, a deformation such as a twist is not generated when the load transmitting beam 107 performs a rocking operation. Consequently, the function of the beam 107 can fully be displayed.

One suspension band 109 is provided to be positioned on the center of each of the fulcrum springs 108A and 108B. Moreover, the arm 107b of the load transmitting beam 107 is extended from one of sides of the block member 101 and is provided in the electromagnetic portion 8.

The following advantages can be obtained by forming the beam-shaped portions 103A and 103B.

First of all, in the case in which the sectional shape of the Roberval portion 104 is a simple square, the suspension band 109 and the fulcrum springs 108A and 108B should be provided in the square. For this reason, a rigid design as the Roberval mechanism cannot be separated from a rigid design as the fulcrum portion. Consequently, there is a problem in that an optimum design as a mass meter is impossible.

In the present structure, the optimal design of the whole integral type Roberval mechanism portion 101 can be obtained by the beam-shaped portions 103A and 103B, and the width of the Roberval portion 104 can freely be set to a width having a rigidity corresponding to the Roberval mechanism. Moreover, these beam-shaped portions are very important as a fixing seat of each of the fulcrum springs 108A and 108B. More specifically, the load of a scale object put on a weighing scale pan is wholly supported on the fulcrum and is transmitted to the electromagnetic portion 8 through the load transmitting beam 107. Therefore, the fulcrum and the fixing seat of the fulcrum should have a sufficient rigidity for left, right, upper and lower portions. In order to keep the rigidity, the fixing widths of the fulcrum springs 108A and 108B should be maintained sufficiently. By setting the ends of the beam-shaped portions 103A and 103B to the fixing seat of these fulcrum springs, it is possible to arrange these fulcrum springs with a necessary rigidity.

Furthermore, if the width of the Roberval portion is increased, the working depth of the integral type Roberval mechanism portion is increased. Consequently, a special tool should be used to carry out the working in some cases. On the other hand, in the present embodiment, the width of the Roberval portion itself should be set small by forming the beam-shaped portions 103A and 103B. Therefore, a cutting depth is small during the working. Accordingly, general cutting machining as well as special working such as wire cut discharge machining can also be carried out. Thus, economic properties can be enhanced. Furthermore, the present embodiment is also advantageous to the overhang support of the integral type Roberval mechanism portion 1 itself. More specifically, it is possible to hold the strength of attachment to a mechanism portion support member 105 high by causing an almost cross-shaped end face to come in close contact with the formation of the beam-shaped portions 103A and 103B.

The reference numeral 110 denotes a support member having a pin 112 for attaching a weighing scale pan 111. While the pin 112 is attached to the integral type Roberval mechanism portion 101 through the support member 110 in the structure shown in the drawing, it is possible to have a structure in which the pin 112 is directly attached to the integral type Roberval portion 101 as a matter of course. By using the support member 110, it is possible to obtain the advantage that the pin 112 can be provided in a place where the direct attachment cannot be carried out, for example, the upper portion of the thin portion 101a as shown.

Figure 6:
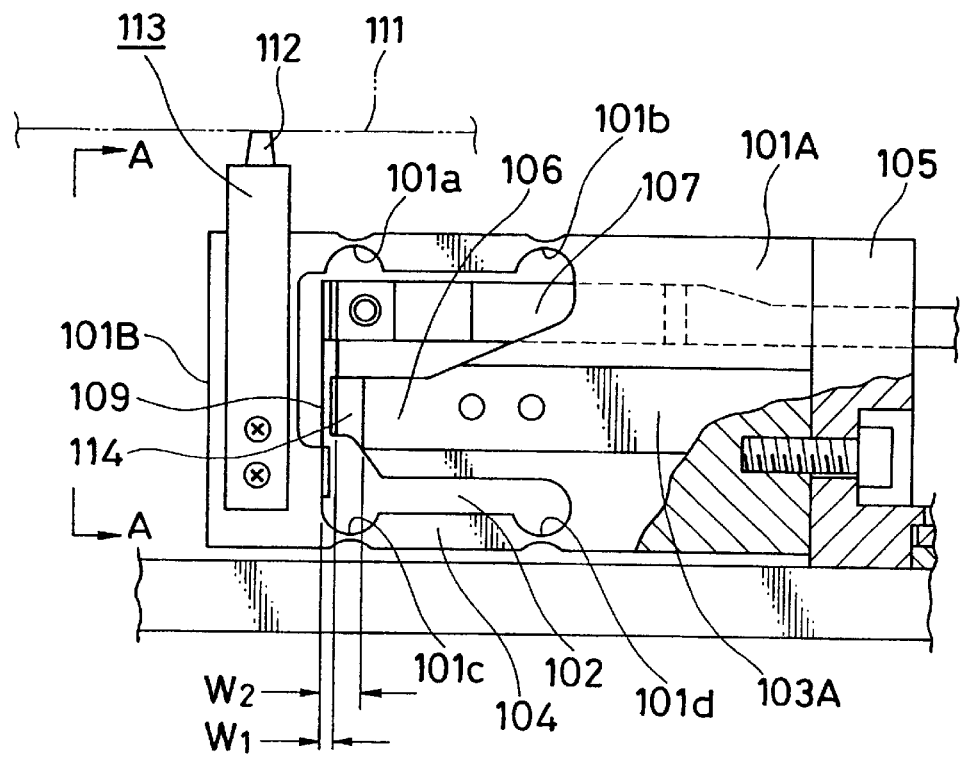
FIG. 6 is a view showing the mechanism of an electronic weighing scale of an electromagnetic equilibrium type according to a third embodiment of the present invention.
Figure 7:
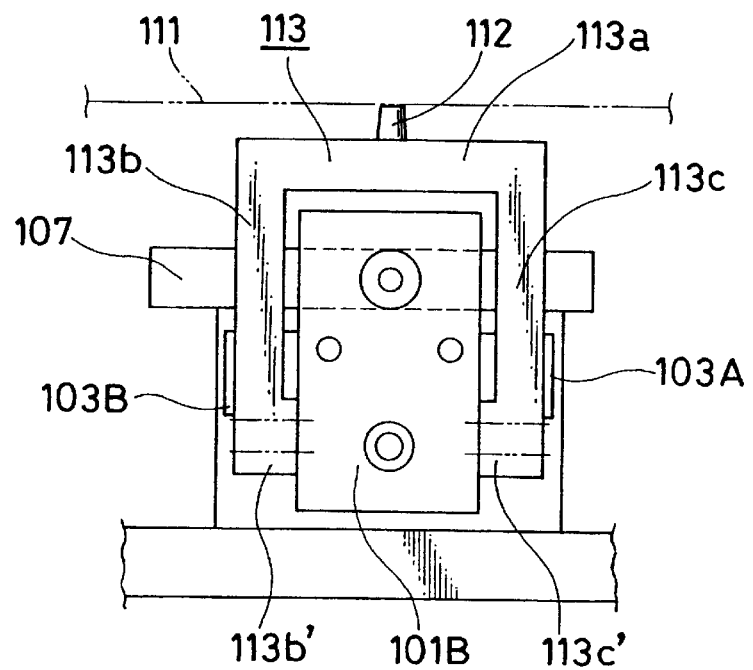
FIG. 7 is a perspective view showing, in the A—A direction, the mechanism portion of the electronic weighing scale of the electromagnetic equilibrium type illustrated in FIG. 6.

FIGS. 6 and 7 show a third embodiment. The reference numeral 113 denotes a support member having a different structure from the structures shown in FIGS. 2 and 3. The support member 113 comprises an upper horizontal portion 113a, suspending portions 113b and 113c positioned on both sides of the upper horizontal portion 113a, and fixed portions 113b' and 113c' extended from the suspending portions 113b and 113c to a load receiving portion 101B of an integral type Roberval mechanism portion 101.

The fixed portions 113b' and 113c' are fixed to the load receiving portion 101B by fixing means such as a screw in a position which is almost on a level with the fixed portion of a suspension band 109 in a load receiving portion 101B of the integral type Roberval mechanism portion 101. As a result, the load of a scale object put on a weighing scale pan 111 is directly transmitted to the vicinity of the suspension band fixing portion of the load receiving portion 101B through the fixed portions 113b' and 113c' of the support member 113. Therefore, it is not necessary to require a partial rigidity for the load receiving portion 101B. Consequently, the degree of freedom of the design of the integral type Roberval mechanism portion 101 can be increased sill more.

Moreover, thin portions 101a to 101d of a Roberval portion 104 have an R portion (a concave portion) formed on the space portion 102 side. In addition, another R portion is formed from the outside opposite to the R portion. With such a structure, the thin portion can be easily adjusted on the outside of the Roberval portion 104.

The reference numeral 114 denotes a spacer member fixedly provided on the tip of a fulcrum attachment portion 106. In the case in which a space portion 102 for forming the Roberval portion 104 is to be formed by cutting machining, for example, a distance between the tip of the fulcrum attachment portion 106 and the fixing seat of a suspension band 109 is determined to 6 mm or more, for example, depending on the diameter of a tool as indicated as $W_2$. In this case, if a spacer 114 is fixedly provided on the tip of the fulcrum attachment portion 106 after the cutting machining, the distance between the tip of the fulcrum attachment portion 106 and the fixing seat of the suspension band 109 can be set freely and a width indicated as $W_1$ can also be set to 1 mm or less, for example.

As described above, a general purpose block member according to the present invention is constituted by using a fulcrum and a force point as separate members, and the thin portions to be the fulcrum and the force point do not need to be subjected to fine working, and the space portion is continuously formed on the general purpose block member. Therefore, the space portion can be formed easily. Accordingly, it is also possible to form the general purpose block member inexpensively by casting in place of cutting or wire cut discharge machining.

Figure 8:
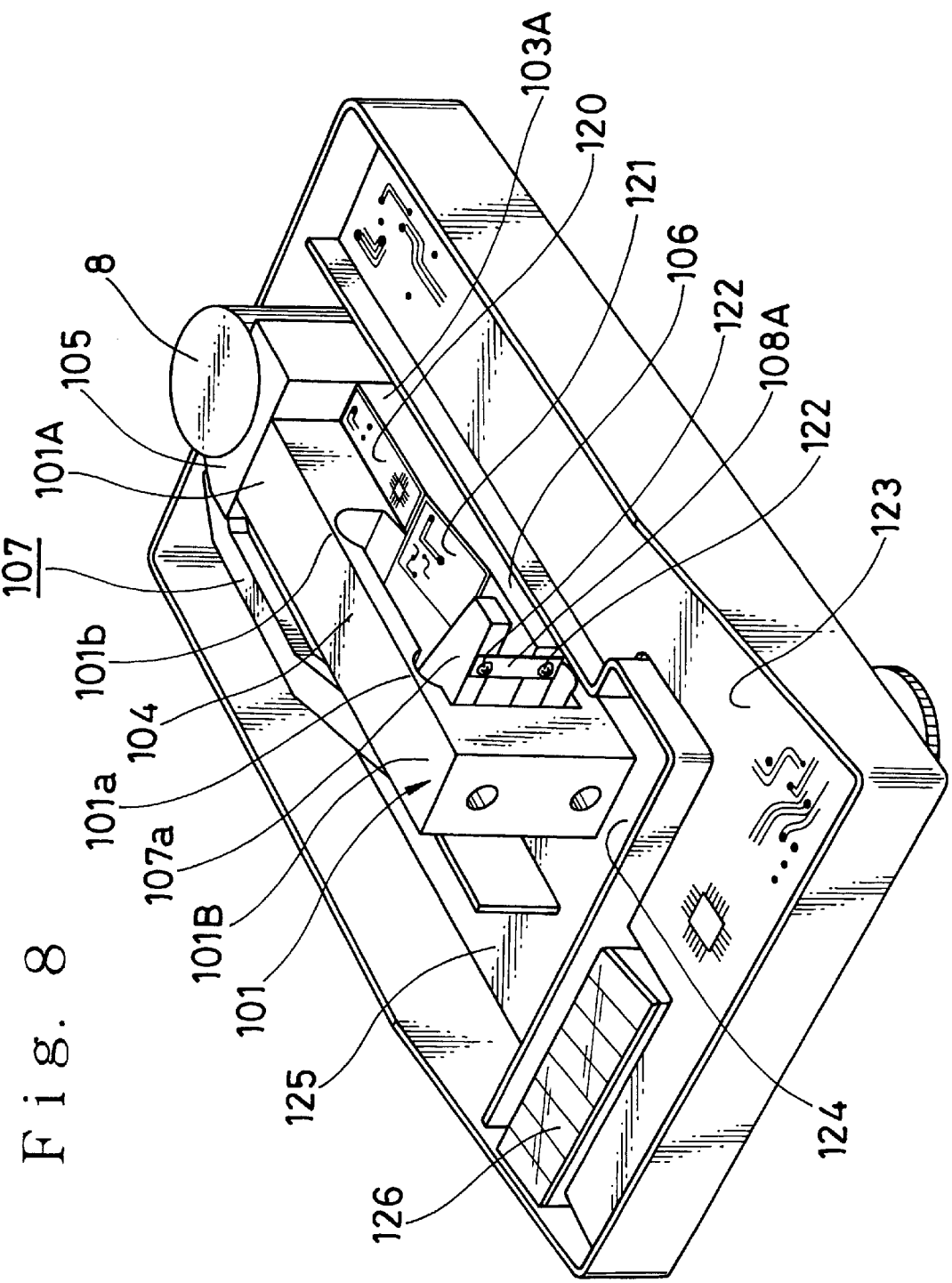
FIG. 8 is a perspective view showing the electronic weighing scale of the electromagnetic equilibrium type in a state in which a general purpose block member is arranged and a top cover is removed.

Next, FIG. 8 shows an example in which the above-mentioned integral type Roberval mechanism is constituted as an electronic weighing scale of an electromagnetic equilibrium type.

First of all, the integral type Roberval mechanism 101 is provided on almost the center in the transverse direction of the housing of the electronic weighing scale. In the integral type Roberval mechanism 101, the fulcrum attachment portion 106 which is partially provided with a beam-shaped portion 103A (103B) is formed more widely as shown than the width of the Roberval portion 104. Therefore, the fulcrum attachment portion 106 itself can be utilized as a plane for the arrangement of an electronic board. In the drawing, the reference numerals 120 and 121 denote an electronic board provided on the fulcrum attachment portion 106. In this connection, a reduction in the size of the electronic weighing scale has been required and it has become hard to keep an arrangement space for the electronic board. Therefore, the utilization of such a portion for the arrangement of the electronic board is very advantageous in respect of the design.

Moreover, fulcrum springs 108A and 108B are positioned on the outside of the Roberval portion 104 by means of the fulcrum attachment portion 106 formed widely. Therefore, it is easy to carry out a work for attaching the fulcrum springs 108A and 108B with a screw 122. Furthermore, a load measuring mechanism comprising an electromagnetic portion 8 and the integral type Roberval mechanism 101 is formed to be small-sized. Therefore, it is possible to horizontally arrange the electronic board in the space portion on the periphery. The reference numeral 123 denotes an electronic basement arranged in an L shape on the space portion. The reference numeral 124 denotes an arrangement space for a built-in weight, and the reference numeral 125 denotes a space for housing a driving portion for operating a built-in weight elevating mechanism. Moreover, the reference numeral 126 denotes a display portion for displaying a measured value, various set contents and the like. The electronic boards 120 and 121 may be set continuously and a spacer may be provided between an oblique portion positioned on the board 121 and the board, thereby attaching the board.

FIGS. 9 to 12 show a fourth embodiment of the present invention.

Figure 11:
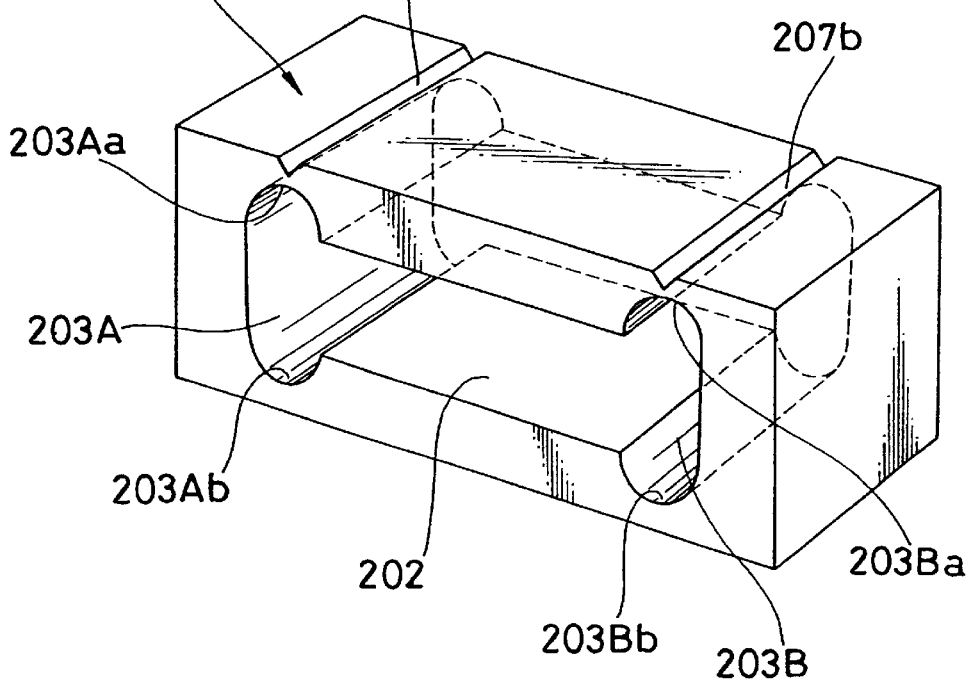
FIG. 11 is a perspective view showing a general purpose block member constituted to utilize a load cell of a strain gauge type according to a fifth embodiment of the present invention.

With such a structure, in order to easily adjust a general purpose block member in which a space portion having thin portions in four upper and lower places is formed between a load receiving portion for receiving the load of a scale object and a fixing portion for fixing the whole block, a working guide portion indicating a part for performing a thinning work by cutting or the like is formed on the surface of at least one of the two thinning portions in the upper parts, and the predetermined part of the working guide portion can be thinned from the upper portion of the general purpose block member. In order to clearly show the adjusted part of the block member, FIGS. 9 and 11 illustrate a block member having a simpler structure than the structure of the general purpose block member shown in FIGS. 1 to 7.

Figure 9:
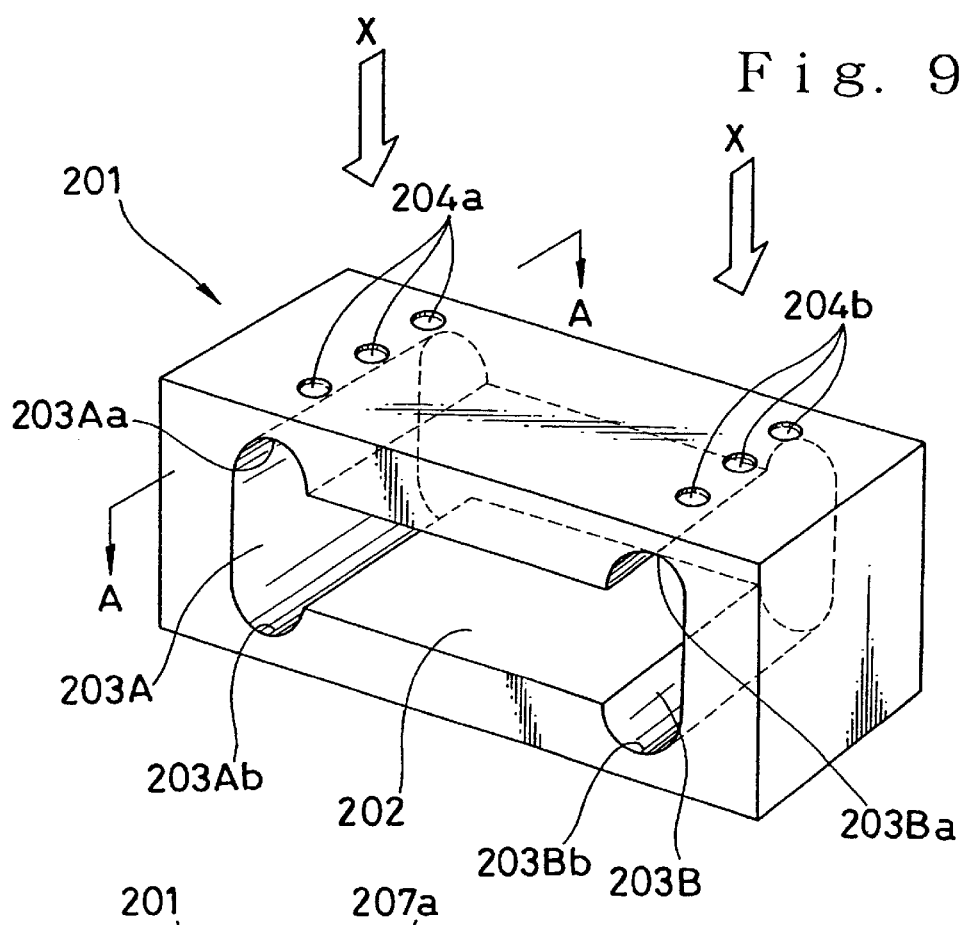
FIG. 9 is a perspective view showing a general purpose block member according to a fourth embodiment of the present invention.

In FIG. 9, first of all, an arrow 201 denotes a general purpose block member formed integrally with a metal block made of an aluminum member. In the shown structure, elliptical space portions 203A and 203B are formed on both ends though a central communicating space portion 202. Consequently, thin portions 203Aa, 203Ab, 203Ba and 203Bb are formed in the upper and lower portions of the space portions 203A and 2031, respectively.

A working guide portion indicating a part for adjusting an integral type Roberval mechanism is formed in the upper thin portions 203Aa and 203Ba of the general purpose block member 201. In the shown structure, the working guide portion is formed as a concave portion provided in the surface parts of the upper thin portions 203Aa and 203Ba. More specifically, a concave portion 204a is formed in three places on the surface part of the upper thin portion 203Aa, and a concave portion 204b is formed in three places on the surface part of the another upper thin portion 203Ba. Moreover, the respective upper thin portions are formed at regular intervals in the width direction (length direction in the drawing) of the respective upper thin portions, respectively.

A scale pan, a load transmitting mechanism and the like are incorporated into the general purpose block member to set a state in which the load can be measured. Thus, shift error adjustment is carried out. In this case, the working guide portions 204a and 204b to be the concave portions are formed in advance. Therefore, the adjustment is carried out by selecting a specific working guide portion and thinning the concave portion to be the working guide portion in the side wall direction by cutting or the like corresponding to the shift error.

Thus, the thinning work produces the following advantages. First of all, all the thinning works are carried out from the upper space of the block member 201 by using a drill, a reamer or the like as represented by a thick arrow X in the drawing. Therefore, the thinning work has no spatial restriction differently from a conventional work in the transverse direction. Accordingly, automation can be realized by utilizing a cutting machine connected to a computer in addition to a manual operation. Thus, the efficiency of the adjusting work can be enhanced considerably. Moreover, the side wall part of the concave portion is cut. Therefore, the concave portion can act as a guide portion to utilize a sharp cutting tool. As a result, the work can be immediately carried out corresponding to the actuation of the tool so that the frictional heat can be minimized during the thinning work by the cutting operation. Consequently, when the frictional heat which is equal to or more than a tolerance in the thinning work is generated, a drift is caused on the measured value by the frictional heat. Thus, it takes a long time to carry out the adjustment. When the frictional heat which is equal to or more than the tolerance is generated, a next work should be carried out in approximately 15 minutes, for example, after a first work is completed to bring down the heat. Therefore, a series of works take a time still more.

FIG. 10 shows a method for the thinning work more specifically. In FIG. 10A, first of all, description will be given to an example in which the central concave portion 204Aa in the concave portion 204a of the thin portion 203Aa is subjected to the work. As an example of the work in a vertical direction shown by an arrow Y, a working tool such as a drill, a reamer or the like which has a greater outer shape than an inside diameter $D_1$ of the concave portion 204a is provided such that the shaft core of the working tool is positioned on the central point of the concave portion. In this state, the cutting tool is arranged in the thin potion 203Aa so that the peripheral wall of the concave portion 204a is cut to be expanded within a range corresponding to the outer diameter of the cutting tool. Consequently, the thin portion 203Aa is thinned by the cut part. In FIG. 10B, the reference numeral 210A denotes the thinned portion.

Moreover, the thinning work may be carried out on a plurality of places around the concave portion 204a by obliquely arranging the working tool as shown by an arrow Z in FIG. 10A. As this method, a reamer or a rotary type file is obliquely arranged in contact in the predetermined position on the upper end of the side wall portion of the concave portion 204a, for example. As shown in FIG. 10C, the thinned portion 201B in a plurality of places is formed in the circumferential direction of the concave portion 204a. In this method, the number of thinned places can also be adjusted. Therefore, it is possible to adjust a very small thinning amount. While the part to be adjusted is a concave portion in the shown structure, this portion can be set to a through hole to cut and adjust the inner peripheral face of the hole.

FIG. 11 shows a fifth embodiment.

In the present embodiment, a series of grooves are formed in the forward direction of the thinned portions 203Aa and 203Ba in the surface parts for the thinned portions 203Aa and 203Ba as the working guide portions (indicated as the reference numerals 207a and 207b). In the present embodiment, the working places are formed as a series of grooves. Therefore, as compared with the case in which the specific concave part described in the above-mentioned embodiment is to be processed corresponding to a shift error, skills are required for specifying a working position. However, it is possible to employ a cutting method for determining the adjusting work by the relation of the working position to the cut amount in the direction of the groove, to predetermine a cutting amount to determine a cut position corresponding to the cut amount or to predetermine a working position to adjust the cut amount or the like. Also in the present embodiment, the working direction implies the work to be carried out from the top of the block member 201.

Figure 12:
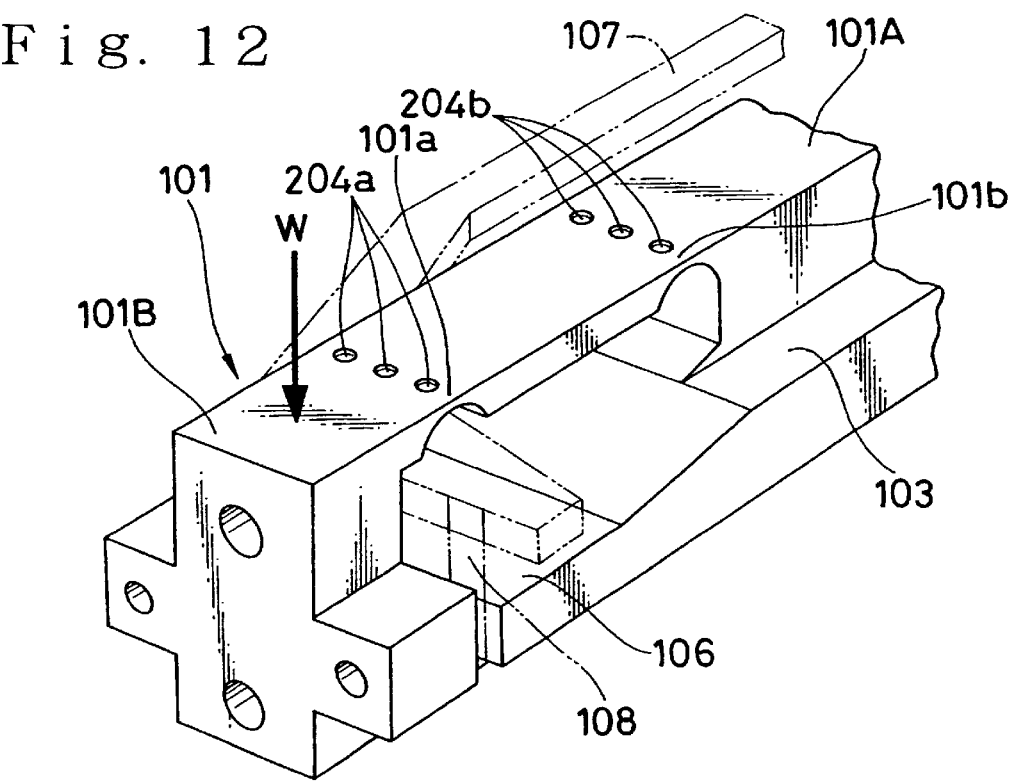
FIG. 12 is a perspective view showing the general purpose block member according to a variant of the fifth embodiment illustrated in FIG. 11.
Figure 17:
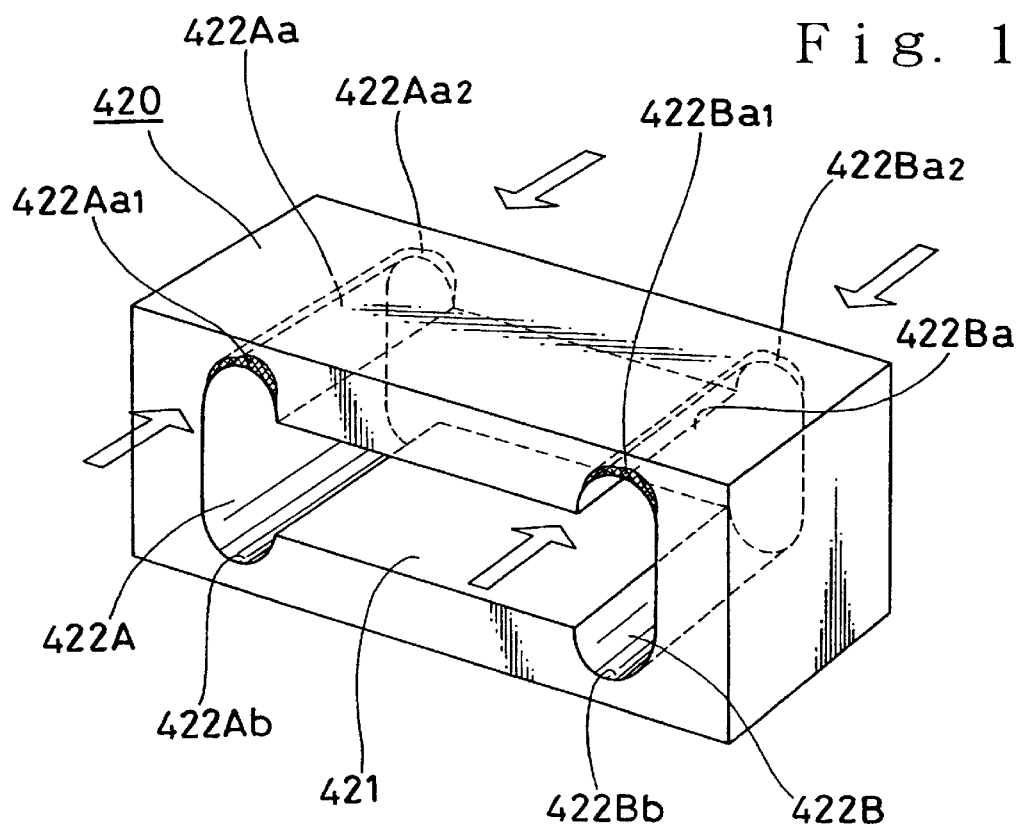
FIG. 17 is a perspective view showing a block member illustrating an adjusting method according to the prior art.
Figure 13:
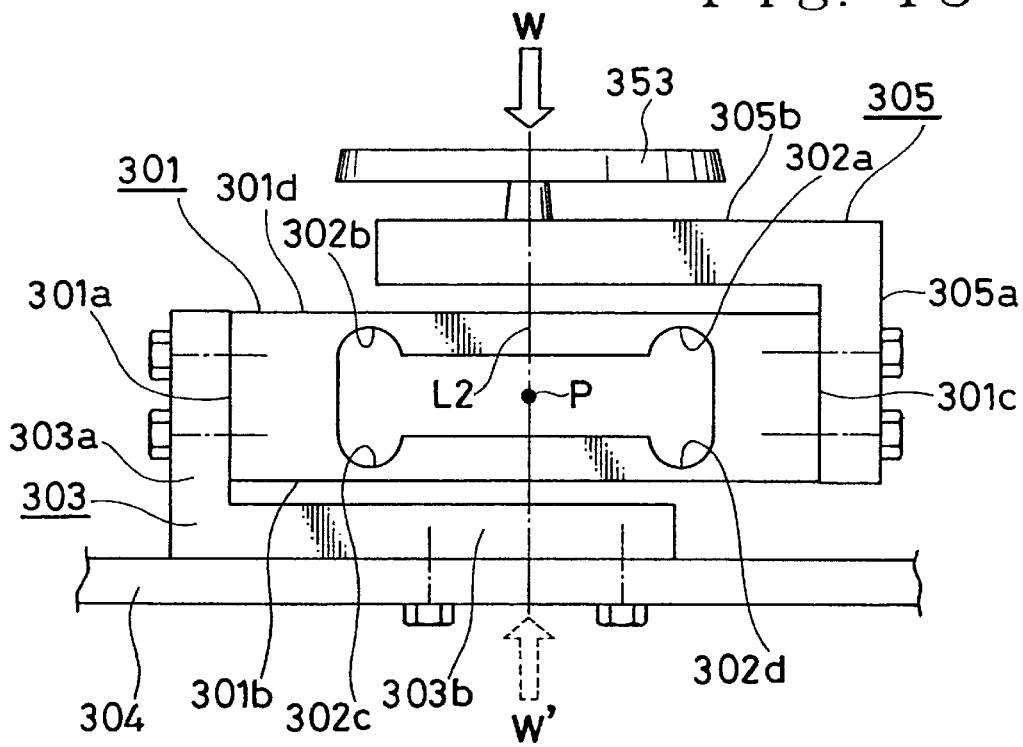
FIG. 13 is a side view showing a block fixing structure according to a sixth embodiment of the present invention.

FIG. 12 shows a structure in which a working guide portion is provided on the structure illustrated in FIG. 5.

Thinned portion is formed in two places of upper and lower parts of the general purpose block member 101 constituted as an integral type Roberval mechanism, and a concave portion is formed as a working guide portion for at least one of thinned portions 110a and 101b in the upper part. In the shown structure, a working guide portion is formed as the concave portions 204a and 204b in both of the thinned portions 110a and 101b. The reference numeral W denotes a load to be applied to the load receiving portion 101B.

A beam-shaped portion 103 is formed and protruded in the longitudinal direction of the general purpose block member 101 on both sides of the block member 101, and a load transmitting beam 107 is fixed to a fulcrum attachment portion 106 of the beam-shaped portion 103 through a fulcrum member 108 such as a leaf spring. In addition, the load transmitting beam 107 is connected to the load receiving portion 101B of the integral type Roberval mechanism 101 through a connecting member which is not shown, and a load W applied to the integral type Roberval mechanism 101 is transmitted to an electromagnetic portion which is not shown through the load transmitting beam 107.

In the integral type Roberval mechanism having the above-mentioned complicated structure, a space where a working tool is to be provided is actually formed on only the top of the general purpose block member. In addition, each thinned portion is formed very thinly to ensure a high precision. Therefore, it is hard to perform other methods than the fine adjustment of the general purpose block member from the upper portion.

FIGS. 13 to 16 show a sixth embodiment of the present invention.

A general purpose block member 301 is constituted to be used as an integral type Roberval mechanism and an elastic body for a load cell. Thinned portions 302a, 302b, 302c and 302d are formed in four upper and lower portions on the general purpose block member 301 in the same manner as in the above-mentioned embodiment. The reference numeral 303 denotes a support member including an attachment portion 303a to which the block member 301 is attached through a side face portion 301a of the general purpose block member 301 and a fixed portion constituted to be orthogonal to the attachment portion 303a. The whole support member 303 is formed in an almost "L" shape on the side face thereof. The fixed portion 303b of the support member 303 is fixed to a base portion 304. Consequently, the general purpose block member 301 is overhung and horizontally supported by the support member 303.

The reference numeral 305 denotes a load transmitting member which is constituted to have the same shape and structure as the support member 303. In other words, the load transmitting member 305 includes an attachment portion 305a to be connected to another side face portion 301c of the general purpose block member 301 and a load receiving portion 305b constituted orthogonally to the attachment portion 305a. The whole load transmitting member 305 is formed in an almost "L" shape on the side face thereof in the same manner as the support member 303. The fixed portion 303b of the support member 303 is positioned in parallel with a lower face portion 301b of the block member 301, while the load transmitting section 305 is positioned in parallel with an upper face portion 301d of the block 301. Consequently, the fixed portion 303b of the support member 303 and the load receiving portion 305b of the load transmitting portion 305 are constituted to be positioned in parallel through the block member 301 such that a part thereof overlaps as seen in the vertical direction.

A weighing scale pan 353 is fixed to the load receiving section 305b of the load transmitting member 305 such that a center to which a load W is applied is positioned on a center line L2 of the block member 301, and the support member 303 is formed to have almost the same shape and size as those of the load transmitting member 305. Therefore, the center line L2 also passes through the fixed portion 303b of the support member 303 positioned under the block member 301. As is apparent from the drawing, an integral structure including the general purpose block member 301, the support member 303 and the load transmitting member 305 is formed to have a point symmetrical shape which uses a central point P of the general purpose block member 301 as a center.

By taking a sufficient rigidity of each of the support member 303 and the load transmitting member 305, the load W applied to the weighing scale pan 353 is transmitted to the general purpose block member 301 through the load transmitting member 305 and has a higher rigidity than the rigidity of the support member 303. Therefore, almost the whole load is transmitted to the fixed portion 303b. Consequently, the load W applied to the weighing scale pan 353 is given onto the center line L2. To the contrary, reactive force W' for the load also acts on the center line L2 in the opposite direction to the load W. Accordingly, the load W and the reactive force W' are positioned on the same axis. As a result, a uniform moment load is applied to the general purpose block member 301.

Figure 14:
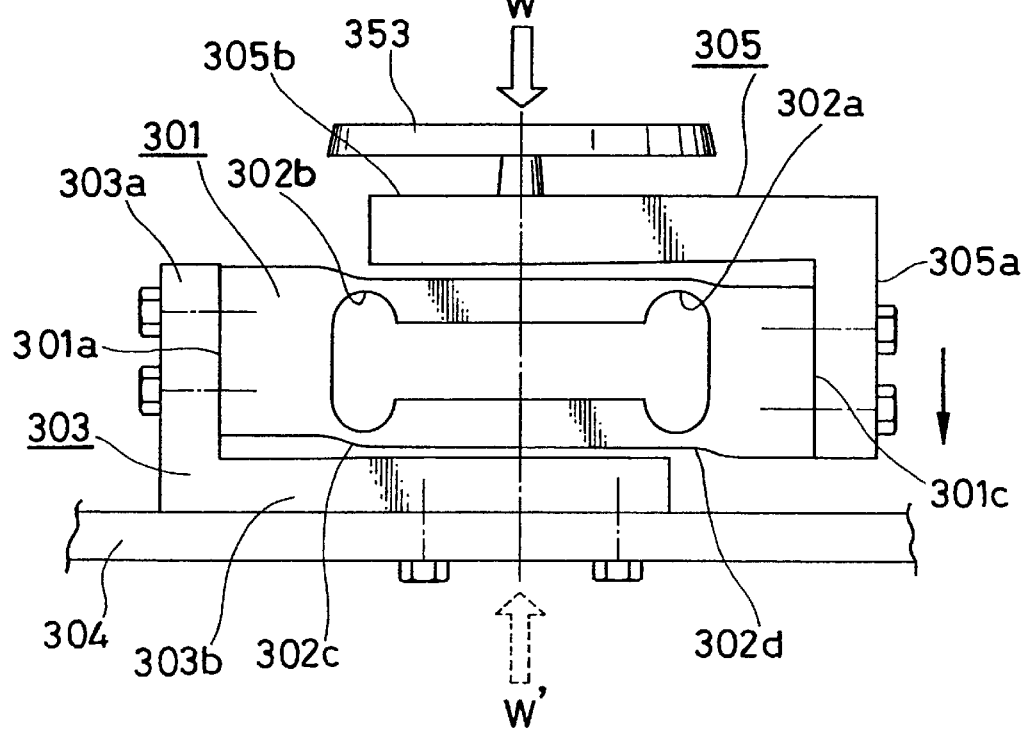
FIG. 14 is a side view showing the deformation state of the block in the block fixing structure illustrated in FIG. 12.

FIG. 14 shows the deformation state of the block member obtained when the load W is applied. The actual deformation is slight and is hard to observe visually. In order to clearly show the deformation in the drawing, however, the deformation amount is exaggerated. When the load W is applied, the general purpose block member 301 is deformed around the thinned portions 302a to 302d and a side edge portion 301c of the general purpose block member 301 is deformed almost ideally such that the support member 303 is moved in parallel with the side edge portion 301a on the connection side. For this reason, the attachment structure of the shown general purpose block member 301 has smaller initial shift errors (which are caused when the mechanism is assembled), and furthermore, is deformed almost ideally. Therefore, the structure can function as not only the integral type Roberval mechanism but also an elastic body for a load cell.

Figure 15:
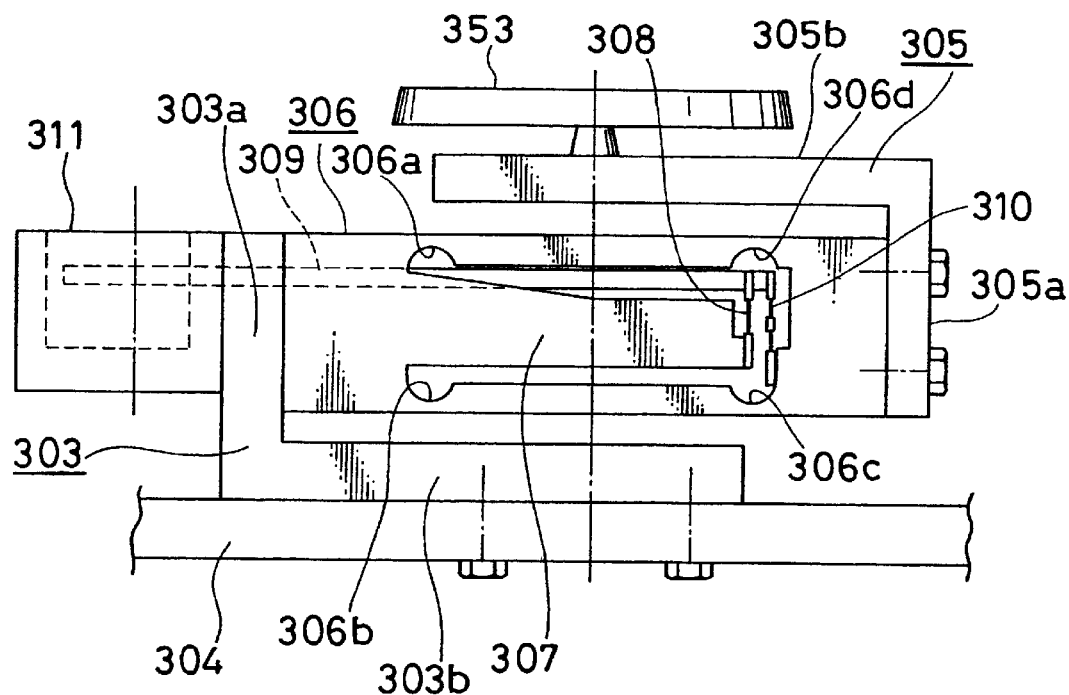
FIG. 15 is a side view showing a block fixing structure according to a seventh embodiment of the present invention.

FIG. 15 shows a seventh embodiment in which the above-mentioned structure is applied to a general purpose block member having almost the same structure as the structure of the general purpose block member to be used as the integral type Roberval mechanism shown in FIGS. 2 to 5.

In a general purpose block member 306, a beam portion 307 is protruded in a block space portion forming thinned portions 306a, 306b, 306c and 306d, and a load transmitting beam 309 is provided on the beam portion 307 through a fulcrum member 308 comprising a leaf spring. Moreover, a connecting member 310 is connected to the movable side to which the load transmitting member 305 of the block member 306 is connected. Consequently, the load transmitting beam 309 is constituted to be rocked corresponding to the displacement of the movable portion of the block member 306 by using the fulcrum member 308 as a fulcrum. Moreover, the other end of the load transmitting beam 309 is connected to an electromagnetic portion 311, and the electromagnetic portion 311 performs an electric output such that electromagnetic force for canceling the rocking displacement of a beam is generated. In this case, the load W is calculated by the electric amount.

In a weighing scale device of an electromagnetic equilibrium type having the above-mentioned structure, a resolution is set to one millionth or more. Therefore, each of the thinned portions 306a and 306b is formed very thinly and a room for the shift adjustment after assembly is very restricted in respect of the structure. The present structure having a small initial shift error is very effective as the attachment structure of the Roberval mechanism for a weighing scale device having a high resolution.

Figure 16:
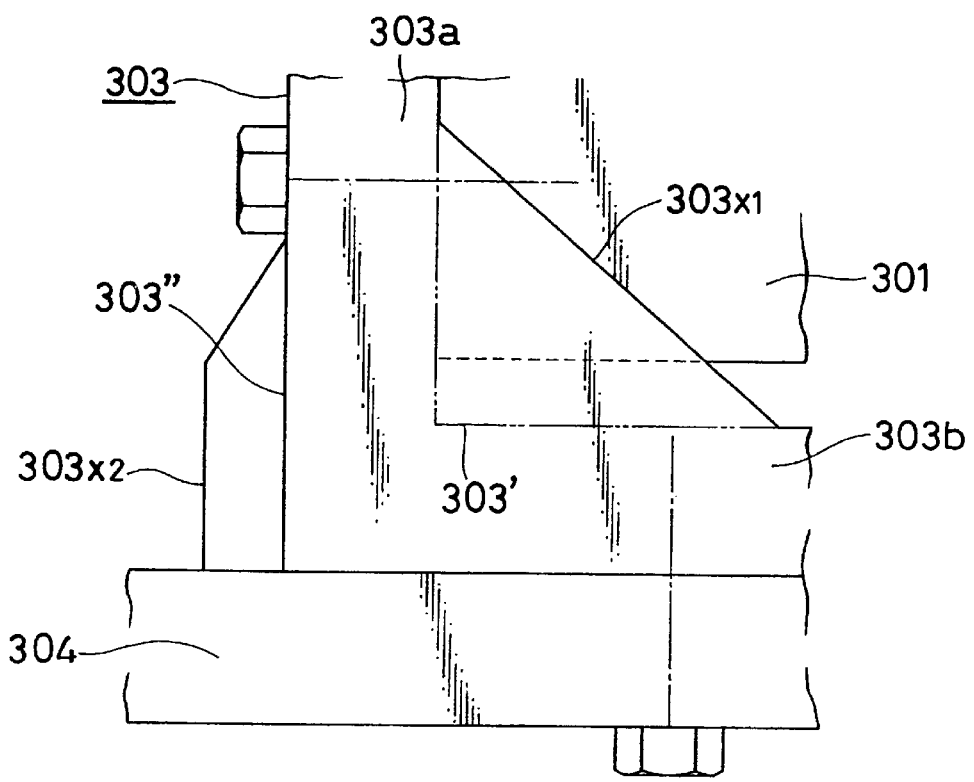
FIG. 16 is an enlarged partial view showing a support member according to an eighth embodiment of the present invention.

FIG. 16 shows an eighth embodiment. In the above-mentioned structure, the initial shift error is reduced. In order to fully display the performance, however, it is necessary to keep the sufficient rigidity of each of the support member 303 and the load transmitting member 305 which are attached to the general purpose block members 301 and 306. In the structure according to the present embodiment, the rigidity of each of these members is more enhanced.

The drawing mainly shows a bent portion of the support member 303, that is, a junction portion of the attachment portion 303a and the fixed portion 303b. In the above-mentioned embodiment, the attachment portion 303a and the fixed portion 303b are formed to have rectangular side shapes as shown in a two-dotted chain line 303' and a solid line 303", and these rectangles are joined together. In the present embodiment, the junction portion is reinforced to enhance the rigidity of the support member 303 still more.

In the drawing, the reference numeral $303x_1$ denotes a reinforced beam portion formed on both sides of the junction portion positioned such that the attachment portion 303a is orthogonal to the fixed portion 303b, and is constituted to function as a reinforcing member for preventing the attachment portion 303a of the support member 303 from being bent and displaced toward the fixed portion 303b side by the load applied to the general purpose block member 301. In this case, a compressive load is applied to the reinforced beam portion $303x_1$ side, while a tensile load is applied to the back side of the attachment portion 303a. Therefore, if a bulged portion which is bulged to the outside of the attachment portion 303a is provided as shown by the reference numeral $303x_2$ in opposition to the tensile load, it is possible to enhance the reinforcing effect still more.

With such a structure, the general purpose block member is constituted almost point symmetrically around a point in almost the central portion. As a result, the positions where the application of the load W and the reactive force W' to the applied load act are placed on almost the same axis. Consequently, the generation of a complicated stress for the general purpose block member can be reduced as much as possible. As a result, it is possible to reduce the initial shift errors more greatly than in the conventional structure.

What is claimed is:

1. An electronic weighing scale using an integral block member constituted to operate as a Roberval mechanism or an elastic body of a load cell, the integral block member including:

a load receiving portion for receiving a load of a scaled object, a fixing portion for fixing the block member as a whole, and a Roberval portion formed by a space portion defining thinned portions between the load receiving portion and the fixing portion for operating as a Roberval mechanism, a load transmitting beam connected to the load receiving portion by a force transmitting member defining a force point of the load transmitting beam and a fulcrum member acting as a fulcrum of the load transmitting beam, the load transmitting beam, the force transmitting member and the fulcrum member being formed separately from the block member, and a member attachment portion constituting a fulcrum and a force point being formed integrally with the block member such that the fulcrum or force point of the load transmitting beam is positioned in the space portion or closely to the space portion, thereby constituting the electronic weighing scale.

2. The electronic weighing scale using a general purpose block member according to claim 1, wherein the general purpose block member is overhung and supported on a support member by the fixed portion of the Roberval mechanism, a fulcrum attachment portion is extended like a peninsula from the fixed portion toward the load receiving portion for the space portion of the Roberval portion, both side portions of the fulcrum attachment portion are formed more widely than a width of the Roberval portion such that they are protruded as beam-shaped portions toward an outside of the Roberval portion, and fulcrum member is interposed between the load transmitting beam and the end of the fulcrum attachment portion such that it is positioned on both sides in a width direction of the Roberval portion and the outside of the Roberval portion.

3. The electronic weighing scale using a general purpose block member according to claim 2, wherein the displacement of the load transmitting portion is transmitted to the load transmitting beam and an end of the force transmitting member is connected to the Roberval portion and the other end is connected to the load transmitting beam, and the fulcrum member is positioned on both sides of the force transmitting member.

4. The electronic weighing scale using a general purpose block member according to claim 2 or 3, wherein an electronic board is provided on at least a part of the beam-shaped portion.

5. The electronic weighing scale using a general purpose block member according to claim 2 or 3, wherein the fulcrum member is a leaf spring, the leaf spring being attached to the fulcrum attachment portion and the load transmitting beam by screw means such as a screw.

6. The electronic weighing scale using a general purpose block member according to any of claim 2 or 3, wherein the load transmitting beam has one beam, an end of the arm being connected to an electromagnetic portion.

7. The electronic weighing scale using a general purpose block member according to claim 2 or 3, wherein a spacer member is attached to a tip of the fulcrum attachment portion and the fulcrum member is fixed to the spacer member, thereby reducing a distance between the fulcrum member and the force transmitting member to obtain close positioning.

8. The electronic weighing scale using a general purpose block member according to any of claim 2 or 3, wherein a member attaching a weighing scale pan is indirectly fixed to the general purpose block member through a support member, thereby freely selecting a position in which the member attaching the weighing scale pan is arranged on the general purpose block member and a position in which the support member is fixed to the general purpose block member.

9. The electronic weighing scale using a general purpose block member according to any of claim 2 or 3, wherein the support member having the member attaching the weighing scale pan includes a horizontal portion in which the member attaching the weighing scale pan, a pair of hanging portions which hangs from both sides of the horizontal portion, and an attachment portion to be extended from the hanging portion to the to the load receiving portion side of the general purpose block member, and the support member is constituted to be connected and fixed to the load receiving portion through the attachment portion.

10. The electronic weighing scale using a general purpose block member according to claim 9, wherein the attachment portion is connected and fixed to the load receiving portion in almost the same position as a connecting portion on a load receiving portion side of the member to be the force point.

11. A weighing scale comprising:
an integral block member having:
   a load receiving portion for receiving a load of a scaled object;
   a fixing portion for fixing the integral block; and
   a Roberval portion having recessed portions between the load receiving portion and the fixing portion;
a load transmitting beam;
a member for transmitting displacement of the load receiving portion to the load transmitting beam and for becoming a force point of the load transmitting beam;
a fulcrum member of the load transmitting beam; and
a fulcrum member attachment portion being formed on the integral block so that the fulcrum of the load transmitting beam is positioned in a space thereby constituting the weighing scale; wherein the member for transmitting displacement of the load transmitting beam and fulcrum member of the load transmitting beam are formed separately from the integral block member.

12. The weighing scale according to claim 11, further comprising a support member, wherein the integral block member is overhung and supported by the support member, the fulcrum member attachment portion extends beyond the Roberval portion on both sides, and the fulcrum member of the load transmitting beam is displaced between the load transmitting beam and the fulcrum member attachment portion.

13. The weighing scale according to claim 11, further comprising at least one another fulcrum member of the load transmitting beam.

14. A weighing scale having an integral block member, comprising:
a support member for supporting the integral block member;
said support member having two inside edges;
a load transmitting member for transmitting a load to the integral block member;
a member for directly receiving a load being connected to the load transmitting member; and
reinforcing member reinforcing the support member, wherein said reinforcing member abuts the two inside edges of the support member.

\* \* \* \* \*